Nov. 2, 1965  A. F. KAY  3,216,018
WIDE ANGLE HORN FEED CLOSELY SPACED TO MAIN REFLECTOR
Filed Oct. 12, 1962  10 Sheets-Sheet 1

INVENTOR.
ALAN F. KAY
BY David A. Rich
ATTORNEY $$D_f = 2a \gg \lambda$$
$$2 r_0 \sin \Theta_0 = 2a = D_f$$

INVENTOR.
ALAN F. KAY
BY David A. Rich
ATTORNEY

Nov. 2, 1965   A. F. KAY   3,216,018
WIDE ANGLE HORN FEED CLOSELY SPACED TO MAIN REFLECTOR
Filed Oct. 12, 1962   10 Sheets-Sheet 3

INVENTOR.
ALAN F. KAY
BY David A. Rich
ATTORNEY

Nov. 2, 1965  A. F. KAY  3,216,018
WIDE ANGLE HORN FEED CLOSELY SPACED TO MAIN REFLECTOR
Filed Oct. 12, 1962  10 Sheets-Sheet 4

INVENTOR.
ALAN F. KAY
BY David A. Rich
ATTORNEY

INVENTOR.
ALAN F. KAY

INVENTOR.
ALAN F. KAY
BY David A. Rich
ATTORNEY

Nov. 2, 1965 A. F. KAY 3,216,018
WIDE ANGLE HORN FEED CLOSELY SPACED TO MAIN REFLECTOR
Filed Oct. 12, 1962 10 Sheets-Sheet 7

PYRAMIDAL HORN VERSION

INVENTOR.
ALAN F. KAY
BY David A. Rich
ATTORNEY

INVENTOR.
ALAN F. KAY
BY David A. Rich
ATTORNEY

SINGLE PLANE MONOPULSE HORN

TWO PLANE MONOPULSE HORN

Nov. 2, 1965  A. F. KAY  3,216,018
WIDE ANGLE HORN FEED CLOSELY SPACED TO MAIN REFLECTOR
Filed Oct. 12, 1962  10 Sheets-Sheet 10

INVENTOR.
ALAN F. KAY
BY David A. Rich
ATTORNEY

United States Patent Office 3,216,018
Patented Nov. 2, 1965

3,216,018
WIDE ANGLE HORN FEED CLOSELY SPACED
TO MAIN REFLECTOR
Alan F. Kay, Cambridge, Mass., assignor, by mesne assignments, to Control Data Corporation, South Minneapolis, Minn., a corporation of Minnesota
Filed Oct. 12, 1962, Ser. No. 230,802
19 Claims. (Cl. 343—781)

The present invention relates to wave translation systems and devices. More particularly, the invention relates to directive microwave antennas for transmitting and receiving microwave energy. More especially, the invention relates to microwave antennas having a primary radiator and curved reflector, such as a paraboloidal reflector, or lens.

As used herein the term "wave translation" includes both the reception and transmission of radiated energy.

In the prior art it is well-known to employ microwave systems involving a paraboloidal reflector and primary feed radiator. In general, the size of the feed aperture and direction of the primary energy is determined so that all of the primary energy radiated strikes the reflector. In many large antennas which are located relatively close to a ground plane, the problem of high input receiver noise is aggravated by spillover from the reflector or lens.

For the prior art antennas, the diameter of the primary radiator aperture is chosen with respect to the diameter and focal length of the reflector and the wavelength of the microwave energy. The primary radiator or feed horn is typically formed from a wave guide transmission line termination and frequently requires only a small taper in the E plane dimension of the guide and little if any taper in the H plane dimension to provide an aperture of proper size. Where a taper is required it is introduced sufficiently gradually so that the phase errors are minimized. In general, the true phase center of the feed appears in the aperture of the feed. Consequently, the focal point of the reflector is located at or slightly behind the feed aperture.

With such a design, a taper in the illumination of the reflector aperture is obtained from 10-20 db, and the energy radiated by the primary radiator which fails to strike the reflector "spillover" energy is of the order of 10-20% of the total energy radiated by the primary radiator. This spillover energy is not focused and is accordingly wasted.

For applications involving a sensitive low-noise receiver, the noise figure is limited primarily by the effective noise temperature of the antenna. In this circumstance the spillover energy causes an appreciable increase in the effective antenna noise temperature and a decrease in sensitivity. In the range, for example, of 1-10 kilomegacycles, a large paraboloidal reflector antenna pointed away from the horizon, neglecting the signals of radio sources, should see a cold sky temperature of 5-10° Kelvin.

With prior art primary feed structure, the spillover characteristic causes the antenna to pick up the noise of the warm earth, 270° Kelvin; thus it increases the effective noise temperature at the antenna to 20–40° Kelvin.

A further disadvantage of conventional horn primary feed systems involves the variation in beamwidth directly with the wavelength. This results in degraded performance at one or both ends of the frequency spectrum. At the low frequency end of the band, the beam tends to be too broad and the spillover energy too large. At the high frequency end of the band, the beam tends to be too narrow. While the spillover at the high frequency end is small, the illumination taper of the reflector is so great that its gain is decreased, its bandwidth decreased and its resolution degraded.

Another disadvantage of the prior art feed systems arises in monopulse radar tracking systems. This is particularly true where a cluster of two to four horns are centered on the focal point. If the aperture of each horn is chosen small enough to provide a satisfactory illumination taper and spillover for the reflector for the sum mode of operation, the difference mode pattern produced is too broad. Conversely if the feed horn diameters are sufficiently large for the proper behavior of the difference mode, the illumination taper in the sum mode is too great.

Still another disadvantage of the conventional feed systems appears when a spherical reflector is utilized as, for example, for wide-angle performance requirements. In this circumstance large phase errors are introduced at the feed aperture.

It is therefore a primary object of the present invention to provide an improved wave translation device for efficient reception and transmission of microwave energy.

Another object of the invention is to provide an improved microwave antenna compatible with extremely low-noise receivers.

Still another object of the invention is to provide an improved microwave antenna of substantially improved efficiency while retaining high gain characteristics.

In accordance with the invention there is provided a microwave antenna. The antenna includes focusing wave translation means having a bounded illumination aperture and a focal point. The focal point and the illumination aperture boundary define an illumination angle. Primary wave translation means are included for illuminating the focusing means. The primary means are disposed in the vicinity of said focal point and directed toward the illumination aperture. The primary means have a bounded primary angle-defining wave translation aperture and include a primary member for producing a substantially spherical wave front at the primary aperture. The center of the sphere is substantially coincident with the focal point. The primary aperture is disposed between the focal point and the illumination aperture. The focal point and the aperture boundary define a primary wave translation aperture angle such that a wave translation dimension of the aperture is longer than a wavelength of translated energy. Wave transmission means are coupled to the primary means for coupling to a source of microwave energy.

Other and further objects of the invention will be apparent from the following description of the invention, taken in connection with the accompanying drawings and its scope will be pointed out in the appended claims.

In the drawings:

FIG. 10(a) is a detailed view in perspective illustrating the transmission line terminal translation cross-section of the primary feed in FIG. 10;

FIG. 12(a) is a front view of the feed horn of FIG. 12;

Principles of operation

Figure 1:
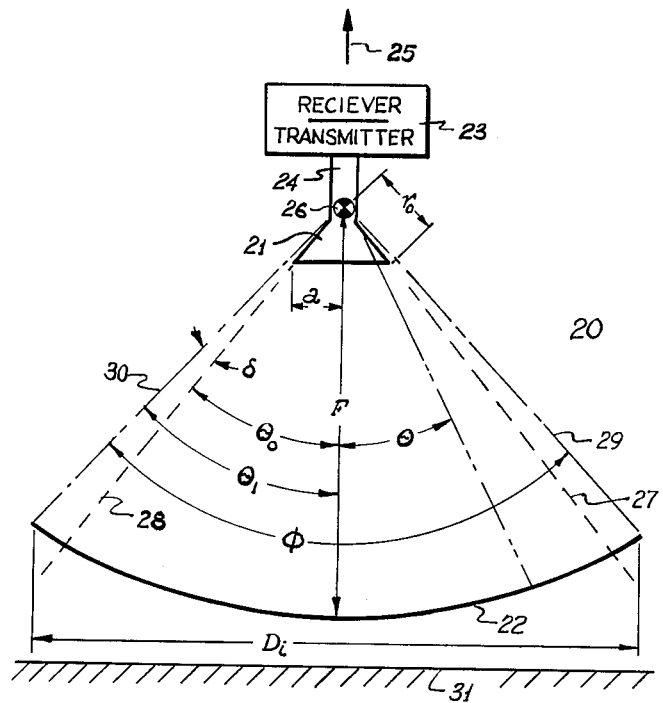
FIG. 1 is a plan schematic view of a microwave antenna embodying the present invention.

The discussion of the principles of operation of the antenna of the present invention is taken particularly with respect to the transmitting situation. It will be apparent that the antenna is reciprocal for transmission and reception of microwave energy, i.e., both receives and transmits energy. The broad principles of the invention are thus directed to a focusing wave translation means which may be either a reflector or a lens and operates reciprocally for transmitted and received energy. The focusing wave translation means is used in combination with a primary wave translation means commonly termed a feed horn. While the terminology again suggests the transmitting case, wherein a primary wave translation means radiates energy into the reflector or lens, it operates reciprocally to receive energy from a focusing reflector or lens.

There is a broad distinction between the antenna of the present invention and prior art atennas which relates to the character of the wave translated at the aperture of the primary wave translation means or feed horn aperture. Any feed horn produces in its aperture a substantially spherical phase front which appears to emanate from the focal point of a cooperating focusing reflector or lens. In a conventional feed horn the phase front in the aperture differs from a plane phase front, or departs from the plane of the aperture, by a distance $d$ less than one-half wavelength. In the present invention said distance $d$ must be greater than one-half wavelength, and the invention is most useful when said distance is considerably greater than one-half wavelength.

This fact has a broad implication with respect to the operation of the antenna. The beamwidth for prior art antennas of the type described is necessarily a function of the wavelength ($\lambda$) and may therefore be termed "diffraction limited." By choosing a spherical phase front at the aperture of the primary radiator, as in the instant invention, which departs from the plane of the aperture by more than a half wavelength ($\lambda/2$), energy of a constant beamwidth is produced substantially independent of frequency. That is to say, at all frequencies above a given frequency for which the wavelength $\lambda_0$ is less than $2d$, the beamwidth of the feed horn is substantially independent of frequency.

The primary radiator of the present invention, the wide flare feed structure, has its phase center in its throat, and its beam width as noted above is substantially independent of the frequency. In constrast prior art feeds are characterized by a phase center in or near the feed aperture and the beamwidth is "diffraction limited" substantially proportional to $\lambda$.

In the prior art the so-called "cornucopia" antenna, a development of Bell Telephone Laboratories, exhibits a relatively low excess noise temperature. This antenna, also termed the horn-reflector of foghorn antenna, is integrally formed from an offset paraboloidal reflector attached to a sectional feed horn. The structure is extremely large and complicated. In the antenna of the invention, the primary wave translation means or feed horn is spaced from the reflector and may be located along an axis of propagation. In contrast the primary radiator of the cornucopia antenna is displaced from the axis of propagation to avoid blocking of the radiated energy.

As noted above, for prior art microwave paraboloidal reflector antennas using a primary radiation feed horn, the feed aperture size is so selected that substantially all of the energy radiated by the feed strikes the reflector. This implies that the diameter $D_f$ of the feed aperture be chosen to be:

Equation (1)

$$\frac{1.5\lambda F}{D_i} < D_f < \frac{3\lambda F}{D_i}$$

where $D_i$ is the boundary of the illumination aperture or the diameter of the reflector, $F$ its focal length and $\lambda$ is the wavelength of the energy radiated. For various reasons, the reflector is typically chosen to have an $F/D_i$ ratio of between one-fourth (¼) and one-half (½). This implies that the diameter $D_f$ is between $.4\lambda$ and $1.5\lambda$.

In contrast, in the present invention the feed horn aperture is chosen to be relatively large compared to the wavelength of the energy radiated.

By using a feed horn with an aperture large compared to the wavelength of the radiant energy, many of the problems inherent in the prior art system are overcome. The gain of the antenna is essentially determined by the illumination angle as defined by the bounded illumination aperture of the reflector and the focal point of the reflector. This is another way of expressing the gain as a function of the apparent taper in energy in the illumination of the reflector. For prior art devices this taper is of the order of 10–20 db.

It will be apparent that the taper is a function of the $F/D_i$ ratio. The illumination angle $\phi$ is typically between 120° and 150°. To reduce the spillover, the flare length of the feed horn should be as large as possible without excessive blocking or shadowing effects. The blocking and shadowing effect occurs when the primary radiator is disposed along or near the axis of propagation of the antenna. For an eccentrically mounted paraboloid, the primary radiator may be located off the axis of propagation. In this circumstance the length of the flare of the feed horn may be extended until the feed horn begins to block the beam of the reflector. Clearly, if the feed horn is extended to the illumination aperture of the reflector, no spillover can take place. It is noteworthy, however, that it is not necessary so completely to extend the primary radiator in order to obtain the desired reduction in spillover.

In accordance with the principles of the present invention, by choosing the primary radiator with an aperture much greater than a wavelength at the frequency of operation and so shaped that the sides of the primary radiator are approximately co-incident with the illumination angle, the spillover may be substantially eliminated.

For a given illumination angle, the total spillover varies inversely in accordance with the length $r_0$ of the flare of the primary radiator divided by the wavelength $\lambda$ of the energy, i.e., $r_0/\lambda$. The larger this ratio becomes, the more well-defined the beam becomes, and the sharper is the transition from light to dark side across a shadow boundary which may be visualized as an extension of the walls of the feed horn to infinity.

When the flare length $r_0$ is suffiiciently large that $D_f$ is much longer than $\lambda$ where Equation (2)

$$D_f = 2r_0 \sin \theta_0$$

where $\theta_0$ is one-half the feed flare angle, the degree of spillover is substantially reduced relative to the prior art devices. Normally spillover is a maximum in the E plane and, compared to the E plane, the spillover in the H plane is relatively negligible. As the flare angle of the primary radiator approaches the illumination angle, side lobes and spillover are substantially reduced. In this condition the illumination taper for the reflector will be close to optimum for maximum gain with minimum spillover.

Some latitude in the flare angle is possible with respect to the angle of illumination without much loss in gain. It turns out that if the flare angle is slightly smaller than the illumination angle, the degree of spillover is somewhat reduced without a significant loss of gain or spoiling the reflector or secondary pattern. When the illumination angle $\theta_1$ is greater than the flare angle $\theta_0$, a phase error is introduced in the sector of illumination of the reflector for radiation angles:

Equation (3)

$$\theta_0 < \theta < \theta_1$$

This error is negligible when $\theta = \theta_0$, and tends to increase with increasing $\theta$. The limit is reached when $\theta = \theta_1$, and the smallest value of $\theta_0$ which can be tolerated for a paraboloid is determined approximately by:

Equation (4)

$$r_0 [1 - \cos(\theta_1 - \theta_0)] = \frac{\lambda}{4}$$

For the case of $\theta = \theta_1$, the phase error is 180° and spillover is minimal. Thus, e.g., for $r_0 = 10\lambda$, $\theta_0 = 65°$ and $\theta_1 = 74°$, the total spillover is less than 1% and is in fact negligible compared to prior art devices. This condition is equivalent to a flare angle of 130° and illumination angle of 148°.

For a spherical reflector, the natural phase error in the range:

Equation (5)

$$\theta_0 < \theta < \theta_1$$

compensates for the spherical aberration. For a given radius R and wavelength $\lambda$, a larger diameter sector of a spherical sector can be illuminated than for a paraboloid before the phase error becomes as large as $\lambda/2$. Consequently an increase in gain can be achieved by a suitable choice of feed flare length and angle for a given spherical reflector. The optimum relationship occurs when the feed horn walls are close to the caustic of the sphere.

The invention has a particular application to monopulse radar tracking systems where more than one input wave guide is required. It is possible to place 2 or 4 open wave guides in the throat of the feed horn. The beamwidth of both the sum and difference modes for monopulse is then determined by the horn flare angle as if these were only a single wave guide input. The illumination of the reflector can then be close to optimum for both the sum and difference modes over a broad band of frequencies.

For an input wave guide which is square or circular in cross-section or otherwise supports two polarizations, or for that matter a single polarization, such as the circular, the feed horn then reproducibly radiates the polarization pattern. Primary feeds embodying the principles of the present invention therefore exhibit a complete dual polarization capability.

Blocking of the radiation from the reflector or shadow effects becomes critical when $2r_0 \sin \theta_0$ is approximately 10% $D_i$, i.e., when the diameter $D_f$ of the feed aperture approaches 10% of the diameter $D_i$ of the bounded reflector illumination plane. At that point the blocking reduces the gain by about .8 db and tends to increase the secondary pattern side lobes by as much as 4 db. Since the blocked energy is reradiated primarily in the forward direction of the beam, however, it does not normally increase the effective antenna noise temperature appreciably. Thus for a reflector aperture diameter $D_i$ as low as $30\lambda$ and the feed aperture diameter $D_f$ as low as $3\lambda$, a system embodying the invention suffers little change in efficiency due to spillover energy. Thus, the antenna efficiency for low noise reception is relatively undisturbed.

The shape of the angle-defining member of the primary radiator feed horn may vary considerably and retain identical spillover characteristics. For example, for a given flare length and flare angle, the feed horn may be conical or pyramidal in shape without degradation of operation. For optimum illumination of the reflector, it is sometimes desirable to introduce a larger flare angle in the H plane than in the E plane. To accomplish this a conical horn may be modified to have an elliptical cross-section. In a very natural way, however, a pyramidal horn can be independently adjusted for illumination of the E and H plane sector angles. A pyramidal shaped feed horn is more compatible with a rectangular wave guide transmission line. For very large ratios of feed flare length to wavelength, i.e., $r_0/\lambda$, however the pyramidal horn tends to produce a rectangular cross-section beam which in the extreme may become inefficient and produce spillover for a reflector having a circular aperture.

From the above considerations it will be seen that for a paraboloid reflector, with minimum spillover, the maximum flare angle is determined approximately by the expression:

Equation (6)

$$2\theta_1 \geq 2\theta_0 \geq 2\theta_1 - 2\cos^{-1}\left(1 - \frac{\lambda}{4r_0}\right)$$

The feed flare angle, $2\theta_0$, then, is less than the illumination angle $2\theta_1$.

For a spherical reflector with a feed flare length $r_0$ large compared to a wavelength $\lambda$, the flare angle may be of course approximately the same as the illumination angle where the diameter of the plane illumination of the sphere is determined approximately by the expression:

Equation (7)

$$D_i = 2(8\lambda)^{1/4} R^{3/4}$$

where R is the radious of the sphere. The maximum flare angle $2\theta_0$ is determined approximately by the expression:

Equation (8)

$$2\theta_1 \geq 2\theta_0 \geq 2\theta_1 - 2\cos^{-1}\left(1 - \frac{\lambda}{2r_0}\right)$$

For this condition the feed horn is positioned in the sphere so that the vertex of the flared section is located between the paraxial focus of the sphere and a point closer to the sphere than the paraxial focus by a distance which may be as much as $\sqrt{\lambda R/8}$. These considerations apply to one or more input wave guides as required, e.g., for monopulse.

*Description and Explanation of the antenna in FIG. 1*

Referring now to the drawings and with particular reference to FIG. 1, there is here illustrated a microwave antenna system embodying the invention. The antenna is generally indicated at 20. A primary wave translation means or radiator 21 provides the illumination for a focusing wave translation means, a paraboloidal reflector 22. A receiver-transmitter 23 is coupled through a wave guide section 24 to the radiator 21. The antenna as shown has an axis of propogation 25. The primary radiator 21 includes an angle-defining member which is a conically shaped feed horn having a vertex substantially co-incident with the focal point 26 of the paraboloid 22. The focal distance from the center of the paraboloid to the focal point 26 is indicated as F. A bounded illumination aperture is defined by the circular aperture of the reflector 22. The diameter of the recflector at the plane is indicated as $D_i$. The angle of illumination defined by the circular boundary of the illumination aperture and the focal point is indicated as $\phi$. Half the flare angle of the feed horn 21 is indicated as $\theta_0$. Half the flare angle $\phi$ is indicated as $\theta_1$ and the angle of a generalized ray of energy is $\theta$ relative to the propagation axis 25. The sector of illumination involving a phase error is indicated as $\delta$.

It will be apparent that:

Equation (9)

$$\delta = \theta_1 - \theta_0$$

and that a phase error exists in the region where:

Equation (10)

$$\theta_0 < \theta < \theta_1$$

One half the aperture width is indicated as $a$; the entire feed aperture width or diameter being $2a$ or $D_f$.

The feed horn length is indicated as $r_0$. The dashed line 27 and 28 indicate the boundary, extended to infinity, of the sides of the flared feed horn 21. The dashed lines 29 and 30 indicate the boundaries of illumination angle $\phi$. The plane of ground or the earth is indicated at 31.

Figure 1A:
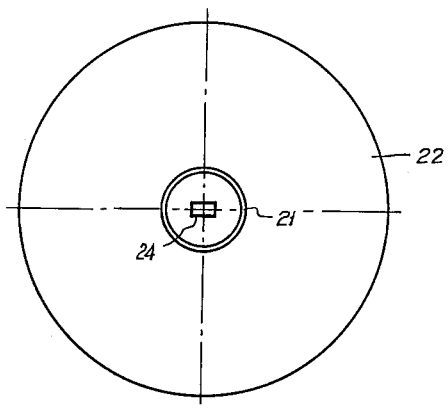
FIG. 1(a) is a front view of the antenna portion of FIG. 1.

In FIG. 1(a) there is a front view presented of the antenna portion of the schematic diagram in FIG. 1.

Energy is received as captured by the reflector 22 and directed toward the horn 21 which is coupled through a wave guide transmission line 24 to the receiver 23. Conversely, transmitted energy may be coupled through the guide 24 to the feed horn 21, directed to the reflector 22 and radiated into space along the axis of propagation 25.

*Description and explanation of the feed horns in FIGS. 2–9*

Figure 2:
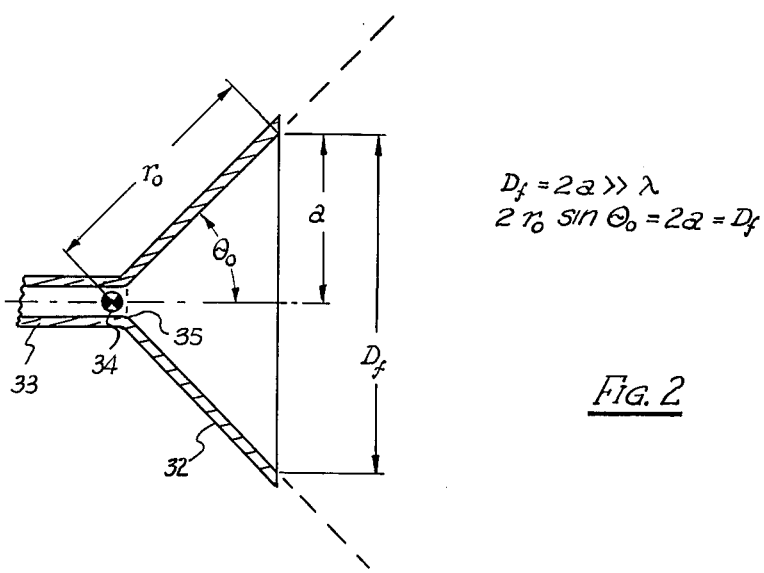
FIG. 2 is a side sectional view of the primary feed horn for the antenna in FIG. 1.

Referring now to FIG. 2, there is here illustrated a side sectional view of a conical primary radiation means. A conical angle-defining feed horn member 32 is coupled to a section of rectangular wave guide transmission line 33. Here the focal point of a reflector is shown at 34 well within the throat of the feed horn 32. A transition taper indicated at 35 is introduced to provide impedance matching between the horn 32 and the guide 33. As shown here the transition flare is indicated with respect to the E plane.

An appropriate fairing or matching section between the transmission line and the horn itself is introduced at the throat to provide proper impedance match over a broader band of frequencies. The transition section 35 has a radial surface to form a spherical transmission line, when the transverse dimension is large enough to support more than one spherical wave mode. Under these conditions the phase front in the horn is spherical with phase center at the throat, in contrast with the conventional feed with a phase center at the aperture.

Figure 3:
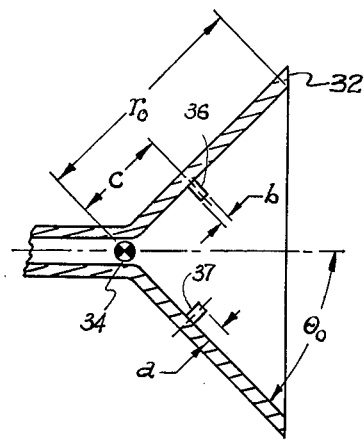
FIG. 3 is a side sectional view of a modification of the horn in FIG. 2.

Referring now to FIG. 3, there is here illustrated a modification of the antenna shown in FIG. 2 wherein radiation suppression means are added to improve the E plane radiation pattern. Without the radiation suppression means, the edges of the horn are strongly illuminated in the E plane. This illumination can be reduced by means of blocking obstacles which tend to excite some of the third order spherical wave mode, the next highest symmetric mode after the dominant mode. Thus, a pair of rod-shaped elements 36 and 37 extend from the inner surfaces of the feed horn 32 into the illumination angle. The elements as shown are perpendicular to the inside conical surface and aligned in the E plane as indicated in the front view of FIG. 4.

The introduction of such blocking obstacles as the rod-like elements 36 and 37 produces an illumination of the horn aperture in the E plane which is then similar to that of the H plane, having relatively low illumination of the edges. The radiation patterns in both planes then become compatible. The height, diameter and disposition of the elements 36 and 37 are so selected as to reduce the excessive E plane radiation to a level commensurate with the H plane radiation to reduce excessive illumination of the edges.

Figure 4:
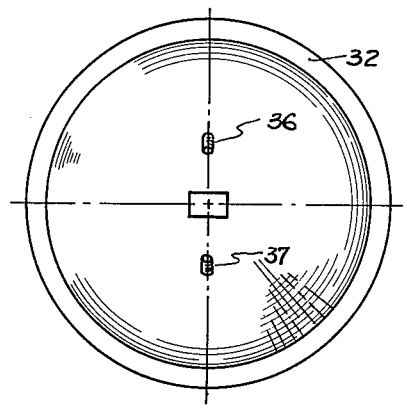
FIG. 4 is a front view of the horn in FIG. 3.
Figure 5:
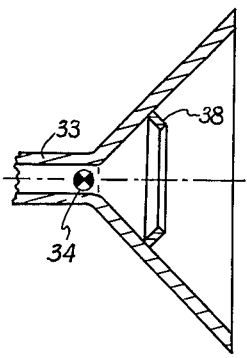
FIG. 5 is a side sectional view of a modification of the horn in FIG. 2.
Figure 6:
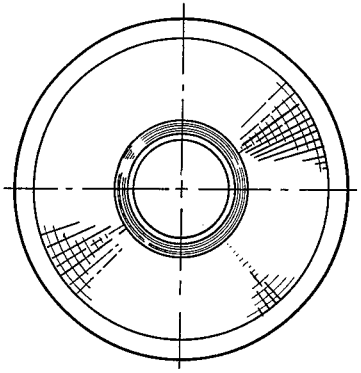
FIG. 6 is a front view of the horn in FIG. 5.

Referring now to FIGS. 5 and 6, there is here illustrated a modification of the radiation suppression means described with respect to FIGS. 3 and 4. Here the rods are replaced by an annular member 38. By replacing the rods as shown in FIGS. 3 and 4 with a thin metal annulus, the E plane pattern behavior is affected as indicated above with respect to the rods. It turns out that the annulus has very little effect on the H plane pattern. The annulus preserves axial symmetry so that a dual polarized wave guide transmission line may be used leading into the flared horn with equal performance for both polarizations because of symmetry. The aperture of the annulus is chosen to be large enough to avoid cutoff of the dominant spherical wave $TE_{11}$ mode and small enough to excite a sufficient amount of the $TE_{31}$ mode substantially to eliminate illumination of the rim of the horn at the feed aperture.

Figure 7:
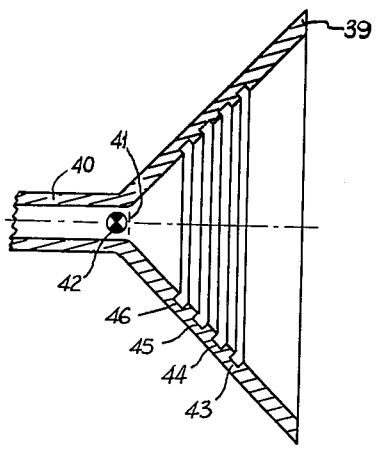
FIG. 7 is a side sectional view of a modification of the horn in FIG. 2.
Figure 8:
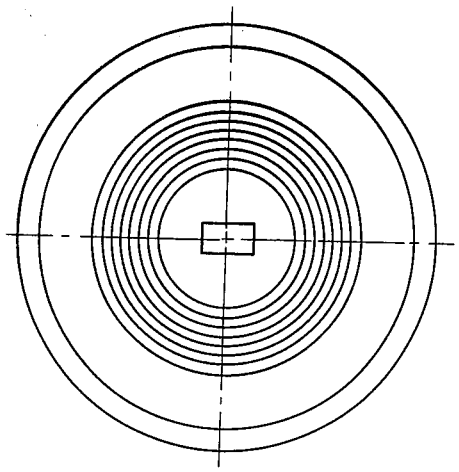
FIG. 8 is a front view of the horn in FIG. 7.
Figure 9:
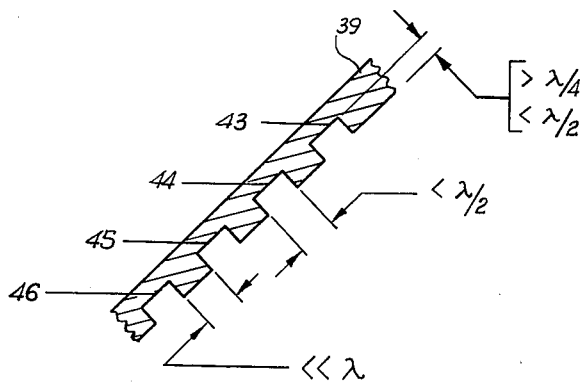
FIG. 9 is an enlarged detailed view of a section of the horn in FIG. 7.

Referring now to FIGS. 7, 8 and 9, there is here illustrated a feed horn 39 coupled to a guide 40 through a transition 41. The horn 39 is conical and has an apex at the point 42. Here a conical fed horn 39 is coupled through a tapered transition 41 to a rectangular wave guide 40. The vertex of the cone of the horn 39 is indicated at 42. Annular grooves are formed in the member 39 to provide a radiation suppression means in the manner described with respect to the annulus of FIGS. 5 and 6. The modification illustrated here is useful for achieving a similar result by utilizing grooves which are closely spaced compared to a wavelength at the frequency of operation and between ¼ and ½ of a wavelength $\lambda$, or an odd multiple thereof in depth. The number of grooves is so selected as to provide the desired effect. The grooves operate to produce an effective wall impedance which is at an apparent negative reactance and locally tends to "lift" waves which are polarized perpendicular to the wall, in addition to waves polarized tangential to the wall. The effect is to "lift" the waves away from the wall in a manner similar to that provided by the boundary condition of a metallic wall. This implies that both the normal and the tangential electric vectors vanish along the wall. This modification offers improved impedance matching at the throat of the horn. In addition, the frequency response is improved. Furthermore, grooves of this character are fairly readily fabricated.

Figure 10:
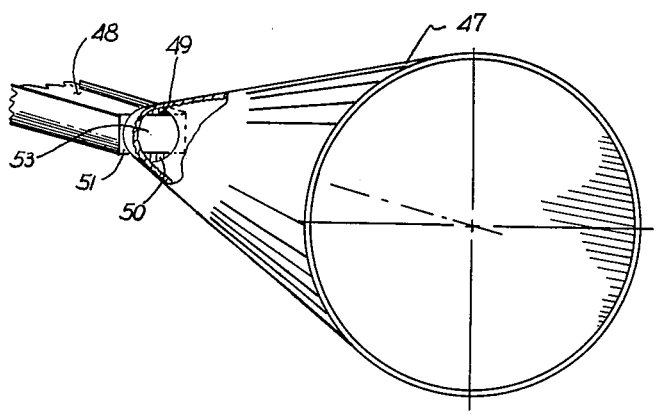
FIG. 10 is a perspective view of a primary feed illustrating a transition.
Figure 10:
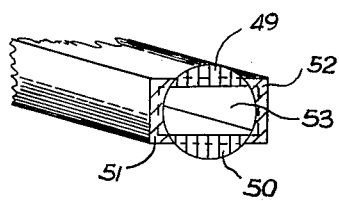
Figure 11:
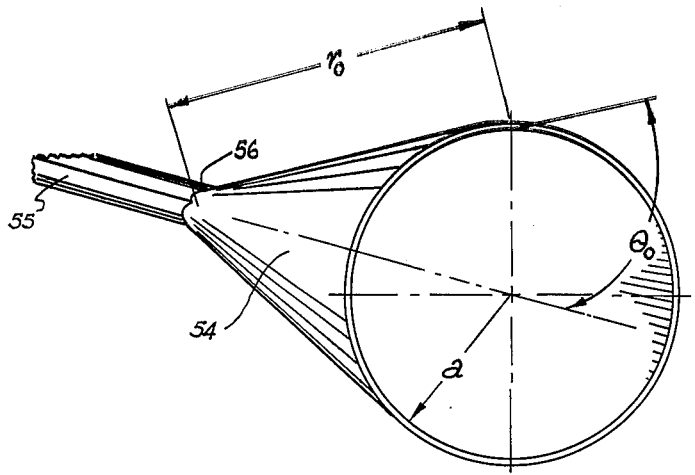
FIG. 11 is a perspective view illustrating a modification of the transition in FIG. 10.
Figure 12:
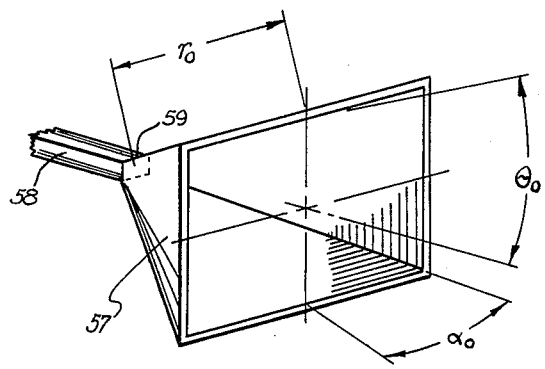
FIG. 12 is a perspective view of a primary feed horn illustrating a further modification of the primary feed in FIG. 10.
Figure 12:
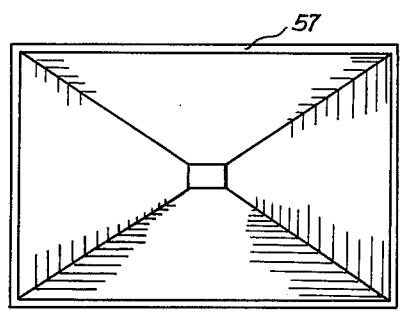

*Description and explanation of the feed horns in FIGS. 10–12*

Referring now to FIGS. 10 and 10(a), there is here illustrated a primary radiation means with a feed horn 47 and wave guide 48. A butt transition is made by the intersection of a conical section and the end of the guide. The intersection of the rectangular cross-section of the guide and the circular cross-section of the horn produces a translation cross-section having a pair of parallel edges bounding the E plane and arcs bounding the H plane. The spaces between the translation cross-sections and the circular cross-section of the cone are filled by metal plates 49 and 50 which are formed in the shape of an appropriate circular segment. Similarly, plates 51 and 52 are inserted in the wave guide to provide the translation cross-section 53.

A butt joint of the character illustrated in FIG. 10 is entirely feasible without violating the principles of the invention. A primary radiator of this character was formed with a conical horn having a flare length of 4.04 inches, a transverse radius of .4 inch at the discontinuity plane and a flare angle of 68°. This radiator operated with a voltage standing wave ratio, VSWR, of less than 1.3 over a frequency band of 9.5 to 12.4 kilomegacycles.

Figure 11A:
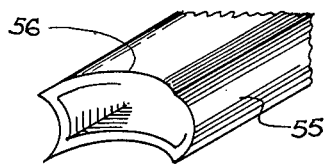
FIG. 11(a) is a detailed view in perspective illustrating the transmission line terminal translation cross-section of the primary feed in FIG. 11.

In FIG. 11 an intersection is illustrated with a conical feed horn 54 joined to a rectangular guide 55 at a curve of intersection 56. The shape of the guide at the translation intersection is particularly illustrated in the detailed view FIG. 11(a). A feed horn of the type illustrated in FIG. 11 was formed by electroforming the horn over a conical steel mandrel in which a rectangular axial hole had been broached for a mandrel for a wave guide. This horn was built for operation at 70 kilomegacycles and had a flare length of 1.69 inches with a flare angle of 130°.

Referring now to FIGS. 12 and 12(a), there is here illustrated a pyramidal feed horn interesting a rectangular wave guide. The pyramidal horn 57 is coupled to a guide 58 at the translation intersection 59 which is now a rectangular cross-section. The flare of the horn may be, as noted above, separately adjusted for the E plane relative to that of the H plane. Note particularly the front view of FIG. 12(a). Here the E plane flare angle $2\theta_0$ may be of the order of 125°, whereas the H plane flare angle $2\theta_0$ may be of the order of 140°.

Figure 13:
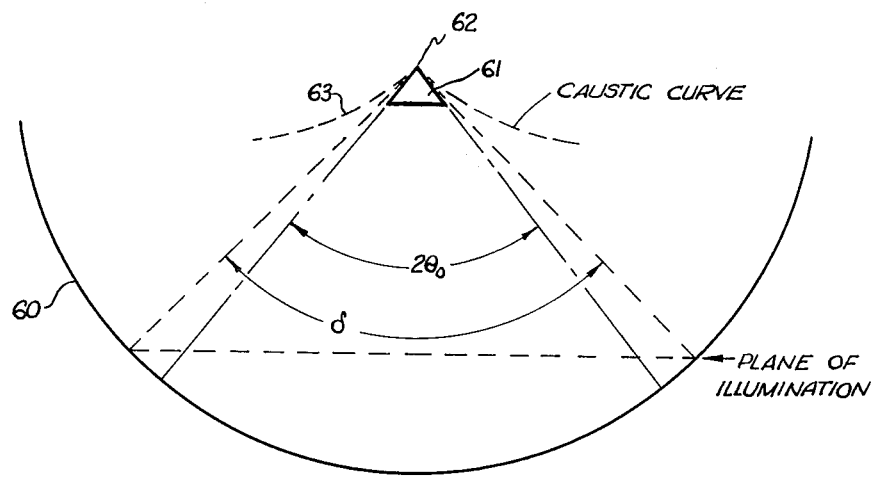
FIG. 13 is a plan schematic view illustrating a modification of the embodiment of FIG. 1.

*Description and explanation of the microwave antenna in FIG. 13*

Referring now to FIG. 13, there is here illustrated a microwave antenna having a spherical reflector 60 and a conical primary radiation feed horn 61 with a flare angle $2\theta_0$ illuminating the spherical reflector 60. The reflector as shown describes an arc of 170°. The horn is located at the paraxial focal point 62. The caustic curve of the reflector is indicated at 63.

For a wide angle performance a spherical reflector is preferred to a paraboloid. As noted above, the natural phase error in the range $\theta_0 < \theta < \theta_1$ compensates for the spherical aberration. For a given radius R and a wavelength $\lambda$, a larger aperture for the spherical reflector can be used than for a paraboloidal reflector before the phase error is, for example, as large as $\lambda/2$. Optimum gain is obtained for this configuration when the flare angle is such that the horn walls are close to the caustic of the sphere.

Figure 14:
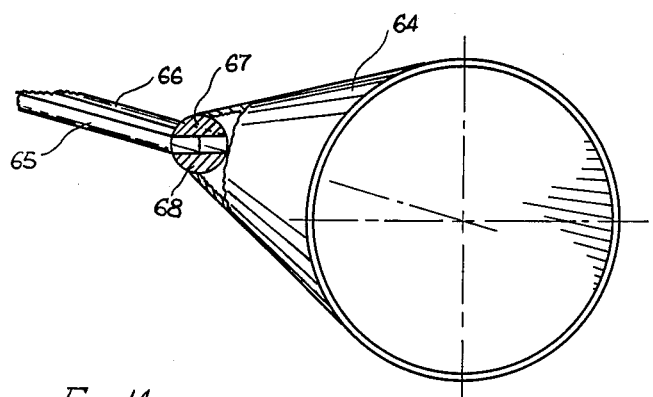
FIG. 14 is a perspective view of a primary feed horn for use with single plane monopulse.
Figure 15:
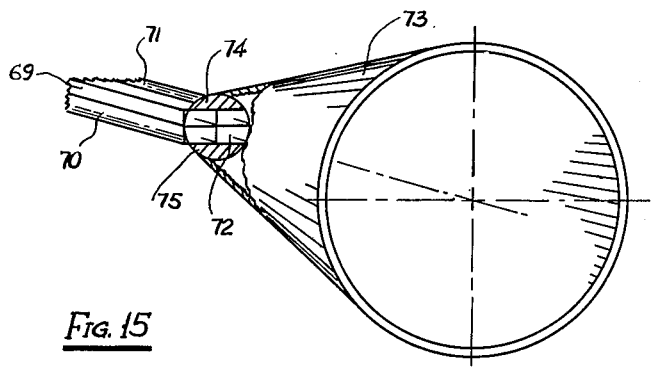
FIG. 15 is a perspective view of a primary feed horn for use with double plane monopulse.

*Description and explanation of the feed horns in FIGS. 14 and 15*

Referring now to FIG. 14, there is here illustrated a conical feed horn 64 coupled to a pair of rectangular wave guide transmission lines 65 and 66. At the butt intersection of the guide and the horn segmented plates 67 and 68 enclose the translation intersection. Here the guides as shown are placed at the throat of the horn to enable a monopulse wave translation system. In the modification of FIG. 15, four wave guide transmission lines 69, 70, 71 and 72 are joined together at the point of intersection with a conical horn 73. The segments surrounding the translation intersection are covered by metal plate segments 74 and 75. For monopulse applications, the illumination of the reflector as noted above may be close to optimum for both the sum and difference modes over a very broad band of frequencies.

Figure 16:
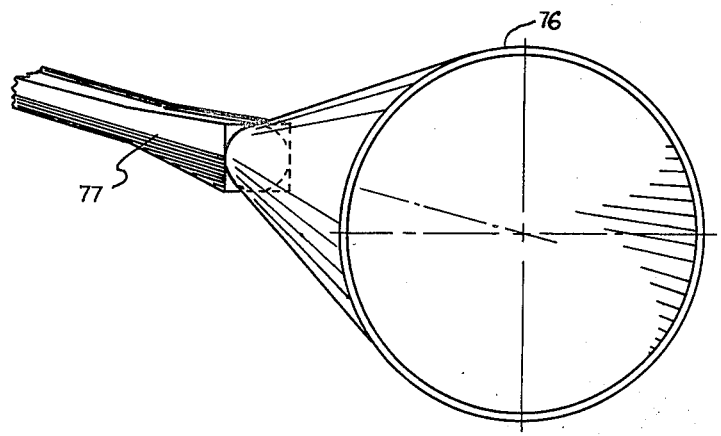
FIG. 16 is a perspective view illustrating a modification of the transition in FIG. 10.
Figure 16A:
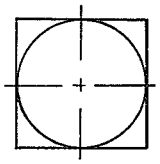
FIG. 16(a) is a front view of the transmission line terminal translation cross section of the primary feed in FIG. 16.

*Description and explanation of the feed horns in FIGS. 16 and 16a*

There is here illustrated a primary radiation means with a feed horn 76 and waveguide 77. The waveguide is tapered in the E plane so that at the transition the cross-section is square or nearly square. This type of transition, as compared to the butt joint illustrated in FIG. 10, serves three purposes:

(1) the impedance match is improved
(2) the E plane taper in the primary aperture is improved in a manner which is alternative to those of FIGS. 3–8.

(3) a means may be added to couple to the polarization orthogonal to the polarization of the untapered waveguide to achieve the dual polarization capability inherent in the symmetric or nearly symmetric transition region.

It will be apparent from the foregoing description that the invention has broad application to the field of wave transmission and reception. It is particularly useful whenever increased efficiency and sensitivity are severe requirements.

While there has hereinbefore been presented what are at present considered to be the preferred embodiments of the invention, it will be apparent to those of ordinary skill in the art that many modifications and changes may be thereto made without departing from the true spirit and scope of the invention.

It will be considered, therefore, that all those changes and modifications which fall fairly within the scope of the invention shall be a part of the invention.

What is claimed is:

1. A microwave antenna, comprising:
  focusing wave translation means having a bounded illumination aperture and a focal point, said focal point and said illumination aperture boundary defining an illumination angle;
  primary wave translation means for illuminating said focusing means and including a primary member having a bounded primary wave translation aperture formed therein and tapered wave translation surfaces defining with said primary aperture a primary wave translation aperture angle having an apex at an internal point, the maximum dimension from said apex to said primary aperture minus the minimum dimension from said apex to said primary aperture being greater than one half wavelength of translated energy, said primary wave translation angle being at least substantially equal to said illumination angle, said primary member being spaced from said focusing wave translation means and so disposed that said apex substantially coincides with said illumination focal point and said primary angle substantially coincides with said illumination angle; radiation suppression means mounted internally of said primary member and coupled to said tapered wave translation surfaces for modifying the boundary conditions for waves emanating from said primary member; and
  means for coupling said member to a source of microwave energy.

2. A microwave antenna, comprising:
  focusing wave translation means having a bounded illumination aperture and a focal point, said focal point and said illumination aperture boundary defining an illumination angle;
  primary wave translation means for illuminating said focusing means and including a primary member having a bounded, plane defining, primary wave translation aperture formed therein and tapered wave translation surfaces defining with said primary aperture a primary wave translation aperture angle having an apex at an internal point and having the relation:

$\delta = R_0(1 - \cos \theta_0) > \lambda/2$ where
$R_0$ = the maximum dimension from said apex to said primary aperture
$\theta_0$ = one half said primary aperture angle
$\delta$ = the difference between the maximum and minimum dimensions from said apex to said primary aperture
and
$\lambda$ = a wavelength of translated energy said primary wave translation angle being at least substantially equal to said illumination angle, said primary member being spaced from said focusing wave translation means and so disposed that said apex substantially coincides with said illumination focal point and said primary angle substantially coincides with said illumination angle; radiation suppression means mounted internally of said primary member and coupled to said tapered wave translation surfaces for modifying the boundary conditions for waves emanating from said primary member; and means for coupling said member to a source of microwave energy.

3. The antenna of claim 1, wherein:
said focusing means focal point is along an axis of propagation.

4. The antenna of claim 1, wherein:
said focusing means is a reflector.

5. The antenna of claim 3, wherein:
said apex is along said axis of propagation.

6. The antenna of claim 1, wherein:
said bounded illumination aperture is circular.

7. The antenna of claim 4, wherein:
said reflector is paraboloidal and has a circular aperture.

8. The antenna of claim 1, wherein:
said bounded primary wave translation aperture is circular.

9. The antenna of claim 1, wherein:
said bounded primary wave translation aperture is rectilinear.

10. The antenna of claim 7, wherein:
said primary member is conically shaped and symmetrically disposed about said axis.

11. The antenna of claim 7, wherein:
said primary member is pyramidally shaped and symmetrically disposed about said axis.

12. The antenna of claim 1, wherein:
said radiation suppression means includes a pair of rod-like elements extending from said primary member into said primary angle.

13. The antenna of claim 1, wherein:
said radiation suppression means includes a thin, annular radiation suppression element extending from said primary member into said primary angle.

14. The antenna of claim 1, wherein:
said radiation suppression means includes an annular groove formed in said primary member.

15. The antenna of claim 14, wherein:
said radiation suppression means includes a plurality of spaced, annular grooves formed in said primary member.

16. The antenna of claim 1, wherein:
said coupling means includes rectilinear wave guide.

17. The antenna of claim 1, wherein:
said primary angle is at least 90°.

18. A primary microwave antenna, comprising:
a primary member having a bounded primary wave translation aperture formed therein and tapered wave translation surfaces defining with said primary aperture a primary wave translation aperture angle having an apex at an internal point, the maximum dimension from said apex to said primary aperture minus the minimum dimension from said apex to said primary aperture being greater than one half wavelength of translated energy, said primary wave translation angle being greater than 90°, said primary member adapted to be spaced from a focusing wave translation means and so disposed that said apex substantially coincides with an illumination focal point of said focusing means and said primary angle substantially coincides with an illumination angle of said focusing means; radiation suppression means mounted internally of said primary member and coupled to said tapered wave translation surfaces for modifying the boundary conditions for waves emanating from said primary member; and
means for coupling said member to a source of microwave energy.

19. The antenna of claim 18, wherein:
said coupling means includes a plurality of juxtaposed wave guides joined to said primary member at a plane of intersection for translating simultaneously a plurality of signals through said primary aperture.

References Cited by the Examiner
UNITED STATES PATENTS

| | | | |
|---|---|---|---|
| 2,283,935 | 5/42 | King | 343—783 |
| 2,416,675 | 3/47 | Beck | 343—781 |
| 2,669,657 | 2/54 | Cutler | 343—783 |
| 2,791,770 | 5/57 | Risser | 343—786 |
| 2,928,092 | 3/60 | Hatch | 343—777 |
| 2,933,731 | 4/60 | Foster | 343—786 |
| 3,055,004 | 9/62 | Cutler | 343—786 |

FOREIGN PATENTS

| | | |
|---|---|---|
| 656,200 | 8/51 | Great Britain. |
| 75,245 | 7/52 | Great Britain. |

OTHER REFERENCES

Slayton: "Electronics," July 1955, pages 150 to 154, Gain Standard Horns.

ELI LIEBERMAN, *Primary Examiner.*

HERMAN KARL SAALBACH, *Examiner.*